(12) United States Patent
Park (10) Patent No.: US 11,052,905 B2
(45) Date of Patent: Jul. 6, 2021

(54) VEHICLE CONTROL SYSTEM FOR ENHANCING STABILITY OF VEHICLE

(71) Applicants: Hyundai Motor Company, Seoul (KR); Kia Motors Corporation, Seoul (KR)

(72) Inventor: Kyun Sang Park, Anseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 379 days.

(21) Appl. No.: 16/211,203

(22) Filed: Dec. 5, 2018

(65) Prior Publication Data

US 2019/0270444 A1    Sep. 5, 2019

(30) Foreign Application Priority Data

Mar. 5, 2018  (KR) .......................... 10-2018-0025885

(51) Int. Cl.
*B60W 30/02*    (2012.01)
*B60W 10/18*    (2012.01)
*B60W 10/20*    (2006.01)

(52) U.S. Cl.
CPC ............ *B60W 30/02* (2013.01); *B60W 10/18* (2013.01); *B60W 10/20* (2013.01); *B60W 2400/00* (2013.01); *B60W 2520/10* (2013.01); *B60W 2520/14* (2013.01); *B60W 2520/20* (2013.01); *B60W 2552/40* (2020.02); *B60W 2710/18* (2013.01); *B60W 2710/202* (2013.01)

(58) Field of Classification Search
CPC ...... B60W 30/02; B60W 10/18; B60W 10/20; B60W 2552/40; B60W 2400/00; B60W 2520/10; B60W 2520/14; B60W 2520/20; B60W 2710/18; B60W 2710/202
See application file for complete search history.

(56) References Cited

U.S. PATENT DOCUMENTS

| | | | | |
|---|---|---|---|---|
| 4,979,115 A | * | 12/1990 | Takahashi | B62D 7/159 180/415 |
| 6,027,183 A | * | 2/2000 | Katayose | B60T 8/1755 303/146 |
| 8,504,243 B2 | * | 8/2013 | Kageyama | B62D 7/1509 701/41 |

(Continued)

FOREIGN PATENT DOCUMENTS

| JP | 2552327 B2 | 8/1996 |
|---|---|---|
| JP | 2006-264617 A | 10/2006 |

(Continued)

*Primary Examiner* — Ramsey Refai
(74) *Attorney, Agent, or Firm* — Morgan, Lewis & Bockius LLP (57) ABSTRACT

A vehicle control system and a method for the same, which are configured for rapidly stabilizing a behavior of a vehicle when an unstable behavior of the vehicle occurs while the vehicle is turning, and, if excessive oversteering occurs, securing a driving characteristic of a vehicle by minimizing intervention of an electronic stability control (ESC) device of the vehicle, may include an ESC device, a steering control device, and a rear wheel steering device, and configured for immediately enhancing stability of a vehicle through cooperative control between the ESC device, the steering control device, and the rear wheel steering device even when excessive oversteering occurs.

19 Claims, 6 Drawing Sheets

[ RWS REVERSE PHASE CONTROL ]

(56) References Cited

U.S. PATENT DOCUMENTS

| | | | | |
|---|---|---|---|---|
| 9,046,044 B2 * | 6/2015 | Shimada | ............... | B60T 8/1755 |
| 2002/0038171 A1 * | 3/2002 | Deguchi | .............. | B62D 15/027 |
| | | | | 701/41 |
| 2018/0065662 A1 * | 3/2018 | Kim | ....................... | B62D 7/159 |

FOREIGN PATENT DOCUMENTS

| | | |
|---|---|---|
| JP | 2010-179675 A | 8/2010 |
| KR | 10-0769525 B1 | 10/2007 |
| KR | 10-1300599 B1 | 8/2013 |
| KR | 10-1316421 B1 | 10/2013 |
| KR | 10-1558761 B1 | 10/2015 |
| KR | 10-1687561 B1 | 12/2016 |

* cited by examiner

[OVERSTEERING SITUATION]

FIG. 3B

[ESC BRAKING CONTROL]

FIG. 3C

[ COUNTER-STEERING ]

FIG. 3D

[ RWS REVERSE PHASE CONTROL ]

FIG. 5

VEHICLE CONTROL SYSTEM FOR ENHANCING STABILITY OF VEHICLE

CROSS-REFERENCE TO RELATED APPLICATION

The present application claims priority to Korean Patent Application No. 10-2018-0025885 filed on Mar. 5, 2018, the entire contents of which is incorporated herein for all purposes by this reference.

BACKGROUND OF THE INVENTION

Field of the Invention

The present invention relates to a vehicle control system for enhancing stability of a vehicle and a method for the same in an oversteer situation. More particularly, it relates to a vehicle control system for enhancing stability of a vehicle and a method for the same when excessive oversteering occurs while the vehicle is turning.

Description of Related Art

Generally, an electronic stability control (ESC) system is a device configured to control an attitude of a vehicle to prevent instability of a vehicle driving, and when an unstable behavior of the vehicle different from an intent of a driver occurs, the ESC system improves stability of the vehicle by reducing an engine torque or performing braking control on each wheel.

The ESC system determines whether to execute the braking control by determining a movement of the vehicle using a yaw rate sensor for detecting a yaw rate of the vehicle on the basis of a driver's steering input.

The ESC system estimates a vehicle speed using a wheel speed sensor, determines an intent of the driver through a steering angle sensor, and determines an unstable behavior (understeer, oversteer, and the like) of the vehicle through a yaw rate sensor.

Understeer and oversteer are known as unstable behaviors of a vehicle.

Among the unstable behaviors, the understeer refers to a phenomenon in which a turning radius of a vehicle becomes larger due to front tire force saturation unlike an intent of a driver, and in the instant case, the ESC system performs an engine torque limitation or braking control for a wheel in a turning inward direction thereof.

The oversteer is a phenomenon in which a turning radius of the vehicle becomes smaller than a turning radius intended by the driver due to rear tire force saturation and, in a severe case, spinout occurs, and in the instant case, the ESC system performs braking control on a wheel in a turning outward direction to stabilize a behavior of the vehicle.

The ESC system is a device configured to control stability of the vehicle and becomes a backbone in cooperative or integrated control with a new chassis technique, and various additional function logics related to the ESC system are being developed.

Meanwhile, when dynamic driving performance is required by a driver, the ESC system may be designed to recognize and prevent only an extreme hazard situation. In such a case, a behavior of the vehicle becomes unstable, and in some cases, an accident may occur.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle control system for enhancing stability of a vehicle and a method for the same, which are configured for rapidly stabilizing a behavior of a vehicle when an unstable behavior of the vehicle occurs, and specifically, when excessive oversteering occurs while the vehicle is turning.

In an exemplary embodiment of the present invention, a vehicle control method may include determining, by a controller, whether oversteering occurs; determining, by the controller, an amount of braking control and performing, by a braking device, the braking control; determining, by the controller, a steering assist torque in a direction opposite a turning direction and controlling a steering control device according to the determined steering assist torque; and determining, by the controller, an amount of rear wheel steering control and performing reverse phase control on a rear wheel steering device according to the determined amount of rear wheel steering control.

In another exemplary embodiment of the present invention, a vehicle control system may include a detecting portion configured to detect vehicle information including a yaw rate of a vehicle, a steering angle thereof, and a lateral slip angle $\beta$; a controller configured to determine a target yaw moment by receiving the vehicle information detected by the detecting portion and determine an amount of braking control according to the target yaw moment; a steering control device configured to generate a steering assist torque; a rear wheel steering device configured to perform rear wheel steering control; and a braking device configured to brake each of wheels according to the amount of braking control determined by the controller, wherein the controller is configured to determine whether oversteering occurs, and when oversteering is determined as occurring, the controller is configured to determine a steering assist torque in a direction opposite a turning direction thereof, transmits the determined steering assist torque to the steering control device, determines an amount of rear wheel reverse phase steering control, and transmits the determined amount of rear wheel reverse phase steering control to the rear wheel steering device.

Other aspects and exemplary embodiments of the invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be fully described in a detail which is suitable for implementation by those skilled in the art with reference to the accompanying drawings. However, the present invention is not limited to the exemplary embodiment included herein and may be implemented in other forms.

Throughout this disclosure, when an element is referred to as "comprising" a component, it refers that the element can further include other components, not excluding the other components unless stated otherwise.

Furthermore, throughout this disclosure, when one element and other element are referred to as being "connected to each other," this means to include all interconnectable forms including a mechanical connection and an electrical connection.

It is a primary objective of the present invention to secure a driving characteristic of a vehicle by minimizing intervention of an electronic stability control (ESC) device of the vehicle, and therefore, it is an objective of the present invention to provide a vehicle control system and a method for the same, which are configured for rapidly stabilizing a behavior of a vehicle when an unstable behavior of the vehicle occurs while the vehicle is turning, and specifically, when excessive oversteering occurs. To this end, various aspects of the present invention are directed to providing an improved vehicle control system including an ESC device, a steering control device, and a rear wheel steering device, and configured for immediately enhancing stability of a vehicle through cooperative control between the ESC device, the steering control device, and the rear wheel steering device even when excessive oversteering occurs and provides a method for the same.

A vehicle control system according to an exemplary embodiment of the present invention will be described in detail below with reference to the accompanying drawings.

Figure 1:
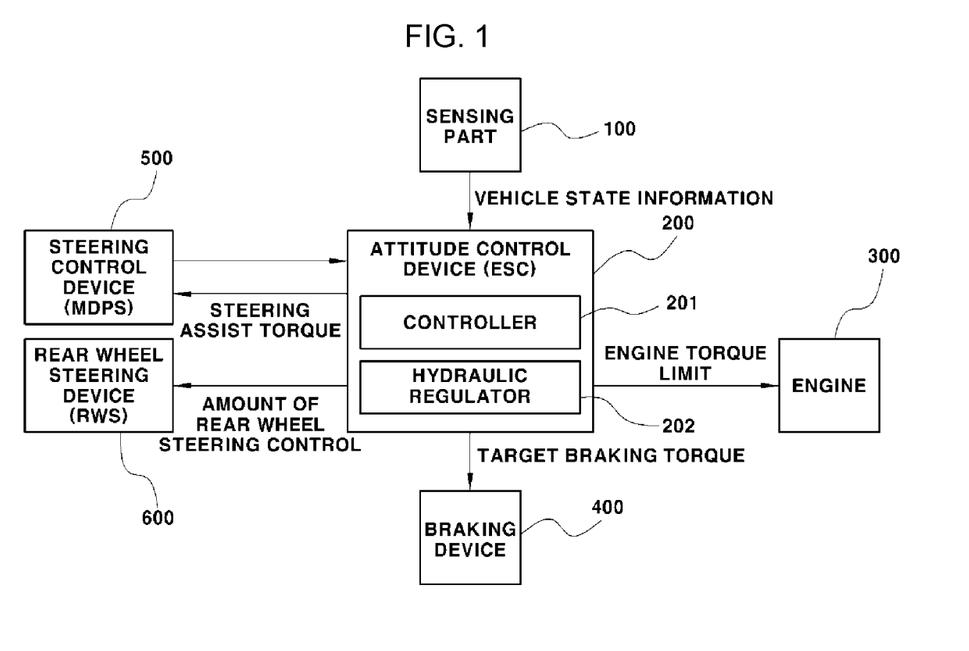
FIG. 1 illustrates a vehicle control system according to an exemplary embodiment of the present invention.

FIG. 1 illustrates a vehicle control system according to an exemplary embodiment of the present invention.

As shown in FIG. 1, the vehicle control system according to the exemplary embodiment of the present invention includes a detecting portion 100 configured to detect vehicle state information, and an attitude control device configured to stably maintain a behavior of a vehicle from the vehicle state information received from the detecting portion 100. The detecting portion 100 may include a plurality of sensors for detecting vehicle state information and, for example, the detecting portion 100 may include various sensors for measuring an engine torque, a vehicle speed, a steering angle, longitudinal acceleration, a lateral acceleration, a lateral slip angle, and a yaw rate. However, in addition to directly detecting the vehicle state information by the above-described sensors, values estimated using other sensor values may be used.

An ESC device 200 of FIG. 1 is the same as a conventional ESC system provided at a vehicle, but the present invention is not limited to an example including the conventional ESC system. The ESC device 200 in an exemplary embodiment of the present invention is configured to determine whether instability of the vehicle occurs, and specifically, an unstable behavior such as oversteering or understeering occurs on the basis of vehicle state information obtained from the detecting portion 100 and an input by a driver. Thereafter, the ESC device 200 stabilizes the vehicle according to a type of the unstable behavior of the vehicle by controlling a target braking torque of each of wheels through a braking device 400 or limiting an engine torque of an engine 300.

Thus, the ESC device 200 according to an exemplary embodiment of the present invention may be configured to control a braking torque of each of the wheels through a controller.

A hydraulic regulator 202 is preferably provided at the ESC device 200 and is connected to a wheel cylinder of each of the wheels via a hydraulic line. That is, the hydraulic line is connected to the braking device 400 configured to apply a braking torque to each of the wheels, and the braking device 400 may be configured to control an operation of the hydraulic regulator 202 for opening or closing a value and adjust a hydraulic pressure delivered to each of the wheels, appropriately controlling an amount of braking torque. Configurations of the ESC device 200 and the braking device 400 are well-known, and thus descriptions thereof will be omitted herein.

The controller 201 receives information such as an engine torque, longitudinal acceleration, a lateral acceleration, a vehicle speed, a steering angle, a lateral slip angle, and a yaw rate from the detecting portion 100 in real-time.

Furthermore, the controller 201 stabilizes a behavior of the vehicle by performing cooperative control using the ESC device 200, a steering control device 500, and a rear wheel steering (RWS) device 600 according to the information input from the detecting portion 100.

To the present end, the controller 201 of the ESC device 200 may be configured to determine an amount of target braking torque required for vehicle control from the vehicle state information transmitted from the detecting portion 100 and control the hydraulic regulator 202 and the braking device 400 according to the determined amount of target braking torque. For example, the controller 201 may be configured to determine an amount of braking control by adding up a first amount of braking control determined on the basis of a yaw rate and a second amount of braking control determined on the basis of a lateral slip angle $\beta$.

Furthermore, the vehicle control system according to the exemplary embodiment of the present invention includes the steering control device 500 configured to generate a front wheel steering assist torque according to an amount of steering assist torque determined from the controller 201. An electric power steering device, that is, a motor driven power steering (MDPS) device driven by a motor may be used as the steering control device 500.

The steering control device 500 is a device configured to provide a steering assist torque to front wheels according to a command of the controller 201, and a configuration of the steering control device 500 such as the MDPS device is also known, and thus a detailed description thereof will be omitted herein.

Furthermore, the vehicle control system according to the exemplary embodiment of the present invention includes the rear wheel steering (RWS) device 600 configured to perform rear wheel steering control according to an amount of rear wheel steering control determined from the controller 201. The RWS device 600 may include an actuator for a rear wheel steering and a controller configured to control the actuator and may further include a sensor for detecting an angle of rear wheels or a position of an actuator driving system. Meanwhile, a configuration of the RWS device 600 is also known, and thus a detailed description thereof will be omitted herein.

Accordingly, any configuration may be applicable to the ESC device 200 according to an exemplary embodiment of the present invention without limitation as long as it is configured for determining the steering assist torque and the amount of rear wheel steering control according to the vehicle state information, transmitting the determined result values to the steering control device 500 and the RWS device 600 as control factors, and controlling an operation of the steering control device 500 and the rear wheel steering device 600.

Furthermore, the present invention illustrates an example in which the controller 201 of the ESC device 200 performs overall control, but this is merely an example, and the overall control may be performed by a high-level controller such as a vehicle controller or by a connection between individual chassis controllers.

Figure 2:
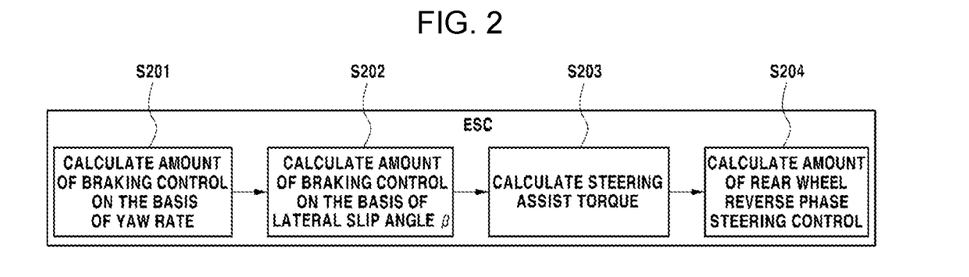
FIG. 2 illustrates a control flow performed by an electronic stability control (ESC) device in a vehicle control method according to an exemplary embodiment of the present invention.

In the case that vehicle control is performed by a system having such configurations, a series of control processes performed by the controller 201 of the ESC device 200 is shown in FIG. 2. Furthermore, FIG. 3A, FIG. 3B, FIG. 3C, and FIG. 3D illustrate vehicle control performed in each situation in terms of the vehicle.

As shown in FIG. 2, the vehicle control system according to the exemplary embodiment of the present invention includes determining an amount of braking control on the basis of a yaw rate (S201), determining an amount of braking control on the basis of a lateral slip angle (S202), determining a steering assist torque (S203), and determining an amount of rear wheel steering control (S204).

The vehicle control method according to the exemplary embodiment of the present invention is performed to stabilize a behavior of the vehicle when excessive oversteering occurs.

Figure 3A:
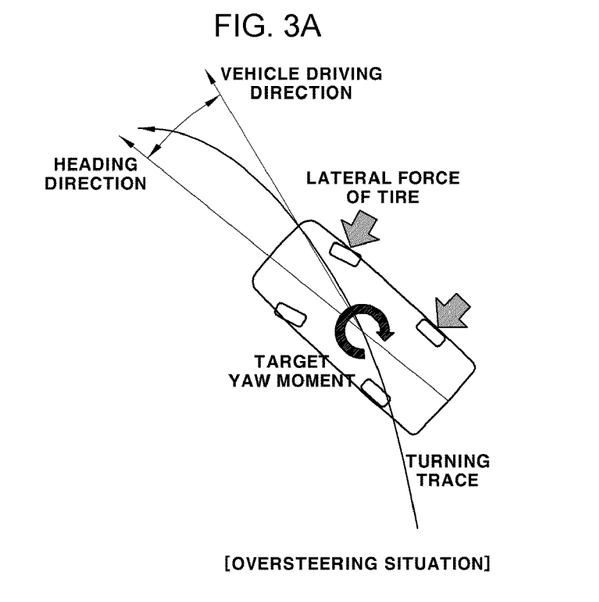
FIG. 3A illustrates a case in which braking control is performed on the basis of a yaw rate.

Therefore, as shown in FIG. 3A, it is necessary to primarily determine whether a current situation is an oversteer situation in which a turning trace is reduced than that intended by the driver. In the oversteer situation as shown in FIG. 3A, when a lateral slip angle becomes excessively larger, a target yaw moment in a direction opposite a turning direction is required for stabilizing a behavior of the vehicle.

In this regard, the determining of the amount of braking control on the basis of the yaw rate (S201) of FIG. 2 includes detecting a target yaw rate and an actual yaw rate of the vehicle and determining a target yaw moment on the basis of the detected yaw rates. To the present end, a target yaw rate $\Psi_{target}$ according to the intent of the driver is determined on the basis of the steering angle, the vehicle speed, the longitudinal acceleration and the lateral acceleration, and the target yaw moment is determined on the basis of an error between the target yaw rate $\Psi_{target}$ and a yaw rate sensor value $\Psi_{real}$ of the vehicle.

Furthermore, the controller 201 of the ESC device 200 determines the amount of braking control for each of the wheels to realize the determined target yaw moment, and thus the braking device 400 is controlled.

Thereafter, the determining of the amount of braking control on the basis of the lateral slip angle (S202) is performed, wherein the lateral slip angle $\beta$ refers to an angle between a heading direction of the vehicle and a traveling direction thereof. Accordingly, the lateral slip angle $\beta$ in an exemplary embodiment of the present invention refers to a lateral slip angle of the vehicle, but this may be replaced with a rear wheel lateral slip angle for a rear tire.

Since occurrence of oversteering and a spin-out tendency become larger as the lateral slip angle $\beta$ becomes larger, when the lateral slip angle $\beta$ becomes larger than a certain level of angle, braking control for an outside turning wheel is performed to generate the target yaw moment configured for stabilizing the behavior of the vehicle.

Whether the lateral slip angle $\beta$ is sufficiently large may be determined by comparing the lateral slip angle $\beta$ with a reference value thereof. The reference value of the lateral slip angle $\beta$ may be differently set according to the vehicle speed and a friction coefficient of a road. For example, the reference value of the lateral slip angle $\beta$ may be set in the range of 4° to 5° on a low friction road and may be set to about 10° on a high friction road.

Figure 3B:
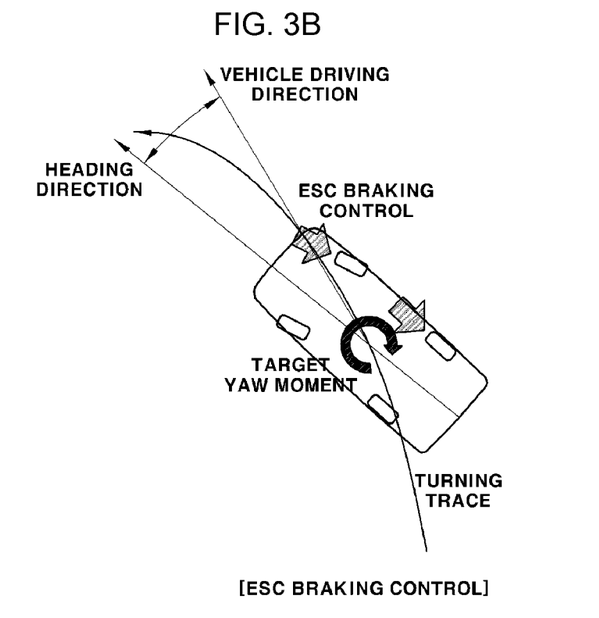
FIG. 3B illustrates a case in which braking control is performed on an external turning wheel to reduce a lateral slip angle.

FIG. 3B illustrates a case in which the ESC device 200 performs the braking control on the outside turning wheel to generate a yaw moment in a direction opposite to the turning direction thereof.

Meanwhile, the operations S201 and S202 may be sequentially performed, and thus, when oversteering occurs, initial ESC braking control is performed to additionally determine whether the lateral slip angle β exceeds the reference value, and then additional braking control is performed to reduce the lateral slip angle β.

Alternatively, the operation S202 may be integrally performed with the operation S201, and in the instant case, ESC braking control is performed by adding up an amount of the braking control with respect to the lateral slip angle β.

Alternatively, according to another exemplary embodiment of the present invention, the operation S202 may be omitted, and in the instant case, the ESC braking control is performed according to the target yaw moment without considering the lateral slip angle β (S201), and then the steering control device 500 and the RWS device 600 are controlled according to the operations S203 and S204.

In the operation S203, when the lateral slip angle β becomes larger than the reference value while the vehicle is turning, that is, when excessive oversteering occurs, a skilled driver performs steering control in a direction opposite a turning direction to prevent such excessive oversteering. In the instant case, the vehicle is to be in a counter-steer state in which the turning direction of the vehicle and a direction of a steering angle thereof are opposite to each other.

Therefore, according to the exemplary embodiment of the present invention, the steering assist torque is applied to induce the counter-steer state of the vehicle so that even a general driver can stabilize the vehicle like the skilled driver. The controller 201 of the ESC device 200 may determine the steering assist torque for inducing counter-steering, transmit the determined steering assist torque to the steering control device 500, and naturally induce counter-steering, assisting the steering control device 500 to prevent an unstable behavior of the vehicle, that is, oversteering.

In this regard, an amount of the steering assist torque may be stored as a predetermined value in the controller 201 of the ESC device 200, and in consideration of steering stability of the driver, the amount of the steering assist torque may be preferably determined as a value level of torque at which counter-steering does not occur. Therefore, a steering force of the driver is required to allow counter-steering to occur, and thus the controller 201 of the ESC device 200 is configured to primarily determine whether counter-steering occurs when performing subsequent control.

Figure 3C:
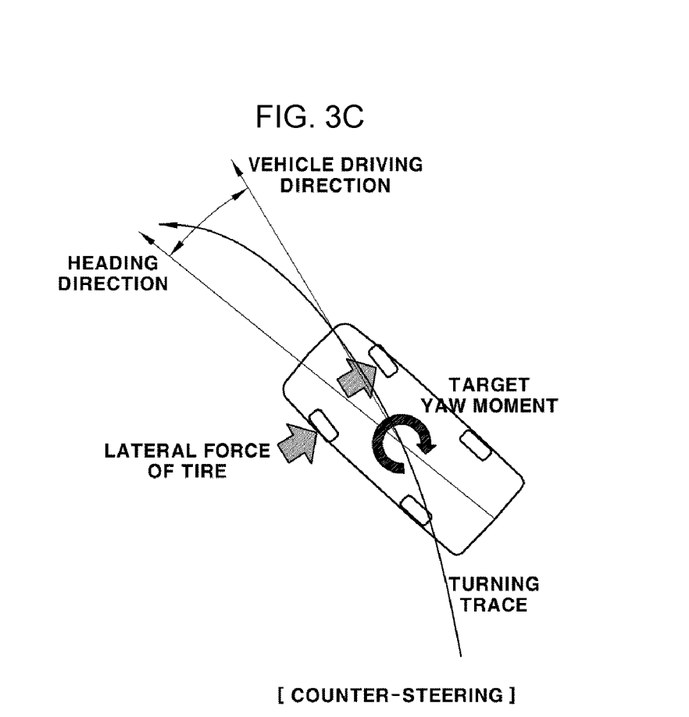
FIG. 3C illustrates a case in which a steering assist torque is applied and thus a vehicle is controlled to be in a counter-steer state.

FIG. 3C illustrates a case in which a current state is switched to the counter-steer state by applying the steering assist torque. As shown in FIG. 3C, as the current state is switched to the counter-steer state, a direction of a front wheel lateral force is changed to contribute achievement of the target yaw moment when compared with FIG. 3A. That is, the target yaw moment may be generated in the direction opposite to the turning direction due to counter-steering, such that the vehicle may be stabilized more rapidly.

Furthermore, in the exemplary embodiment of the present invention, the determining of the amount of rear wheel steering control (S204) is included to stabilize the behavior of the vehicle in an oversteer situation.

The rear wheel steering control is performed in a reverse phase under a low speed condition and is performed in a same phase under a high speed condition, and when the ESC braking control intervenes, the rear wheel steering control is prevented. Here, the same phase refers that directions of the front wheel steering and the rear wheel steering are the same, and the reverse phase refers that the directions of the front wheel steering and the rear wheel steering are opposite to each other.

Meanwhile, according to the exemplary embodiment of the present invention, even when the ESC control intervenes at a time when oversteering occurs, the rear wheel steering device 600 is controlled in the reverse phase even in a high speed situation when the driver performs counter-steering.

That is, in an exemplary embodiment of the present invention, when the driver performs counter-steering in the oversteer situation, reverse wheel reverse phase control is performed to increase a rear wheel lateral force, contributing to the achievement of the target yaw moment. That is, the RWS device 600 may be controlled in the reverse phase to reduce the amount of braking control of the ESC and an amount of the counter-steer by the driver, and at the same time, the lateral slip angle may rapidly converge on zero to contribute to the improvement in stability of the vehicle.

Figure 3D:
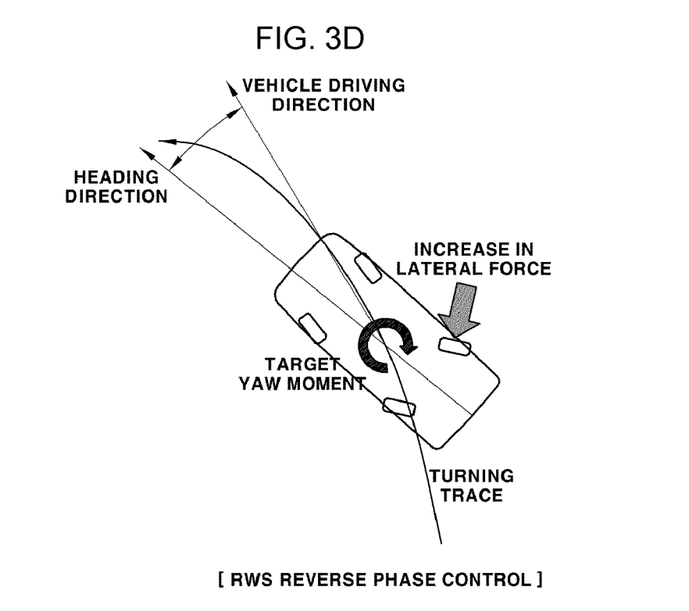
FIG. 3D illustrates a case in which a vehicle is controlled to converge on a target yaw moment through rear wheel reverse-phase control.

FIG. 3D illustrates an example in which the RWS device 600 is controlled in the reverse phase, and a case in which the rear wheel lateral force is increased to contribute to the achievement of the target yaw moment.

Figure 4:
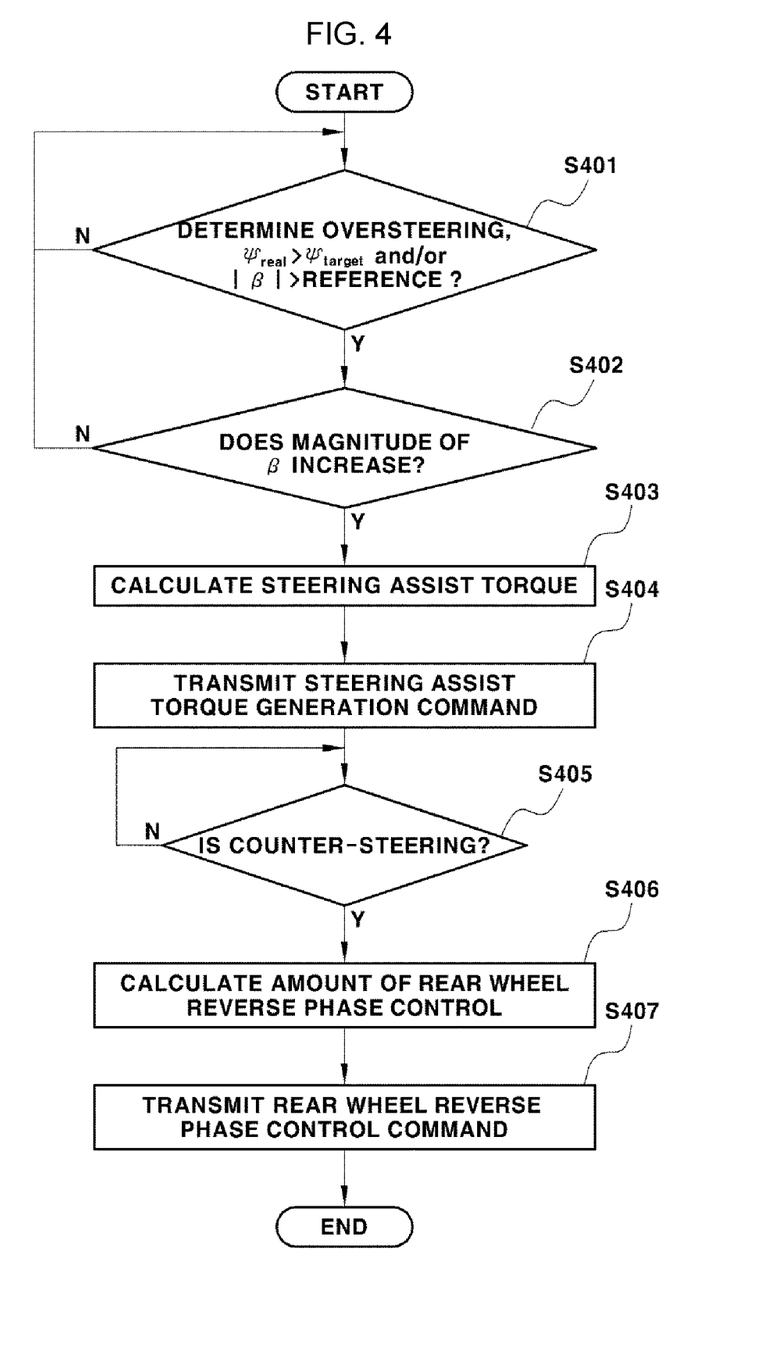
FIG. 4 illustrates an example of the vehicle control method according to the exemplary embodiment of the present invention.

FIG. 4 illustrates a process in which the steering assist torque is applied, and the rear wheel reverse phase control is performed in the vehicle control method according to the exemplary embodiment of the present invention.

In the example of FIG. 4, it is assumed that the braking control is performed in real time by the ESC device 200, and therefore, operations relating to the ESC braking control are not shown in FIG. 4.

As shown in FIG. 4, determining whether oversteering occurs is first performed on the basis of the yaw rate or the lateral slip angle (S401). For example, occurrence of oversteering may be determined by whether a measured actual yaw rate $\Psi_{real}$ is larger than a target yaw rate $\Psi_{target}$ or the lateral slip angle β is equal to or greater than the reference value. Alternatively, the above-described two conditions, that is, determining conditions for the yaw rate and the lateral slip angle β may be used together.

Thereafter, determining whether a current section is a section in which a magnitude of the lateral slip angle β continuously increase may further be performed (S402). In this regard, since there is a possibility in that additional oversteering due to inertia may occur in a section in which the lateral slip angle β is decreased and thus a turning direction is changed, it is preferable to determine the steering assist torque and the amount of rear wheel reverse phase control in only a section in which the lateral slip angle β increases.

Accordingly, when the current section is determined as a section in which the lateral slip angle β continuously increases through the operation S402, the steering assist torque and the amount of rear wheel reverse phase control are determined.

The steering assist torque may be determined on the basis of the yaw rate and the lateral slip angle β in consideration of a direction of a yaw moment which is currently required for the vehicle (S403) as follows.

> Amount of steering assist torque=(target yaw moment based on yaw rate+lateral slip angle β)×gain−D, wherein D refers to a dead zone value with respect to the amount of steering assist torque.

In the determining of the steering assist torque as described above, the gain may be set to prevent occurrence of counter-steering due to the steering assist torque.

When the steering assist torque is determined, the controller 201 of the ESC device 200 transmits a steering assist torque generation command to the steering control device 500 to generate the determined steering assist torque (S404).

As the generated steering assist torque is applied, the driver performs steering control opposite to a turning direction such that counter-steering occurs. At the present point, the controller 201 of the ESC device 200 may determine whether counter-steering occurs (S405). In the present stage, the controller may be configured to determine whether a turning direction is left or right using a lateral slip angle β, and when a direction of a steering angle is different from a turning direction thereof, the controller 201 may determine counter-steering as occurring.

When the counter-steer state is determined, rear wheel reverse phase control is performed, and at the present point, an amount of rear wheel reverse phase control may be determined on the basis of an amount exceeding a reference value of the lateral slip angle β and a variation thereof as follows (S406).

Amount of rear wheel reverse phase control=(lateral slip angle β−reference of lateral slip angle β)×variation of lateral slip angle β×gain As described above, when the amount of real wheel reverse phase control is determined (S406), the controller 201 of the ESC device 200 transmits a rear wheel reverse phase control command to the RWS device 600 to perform the rear wheel reverse phase control according to the determined amount of real wheel reverse phase control (S407).

Figure 5:
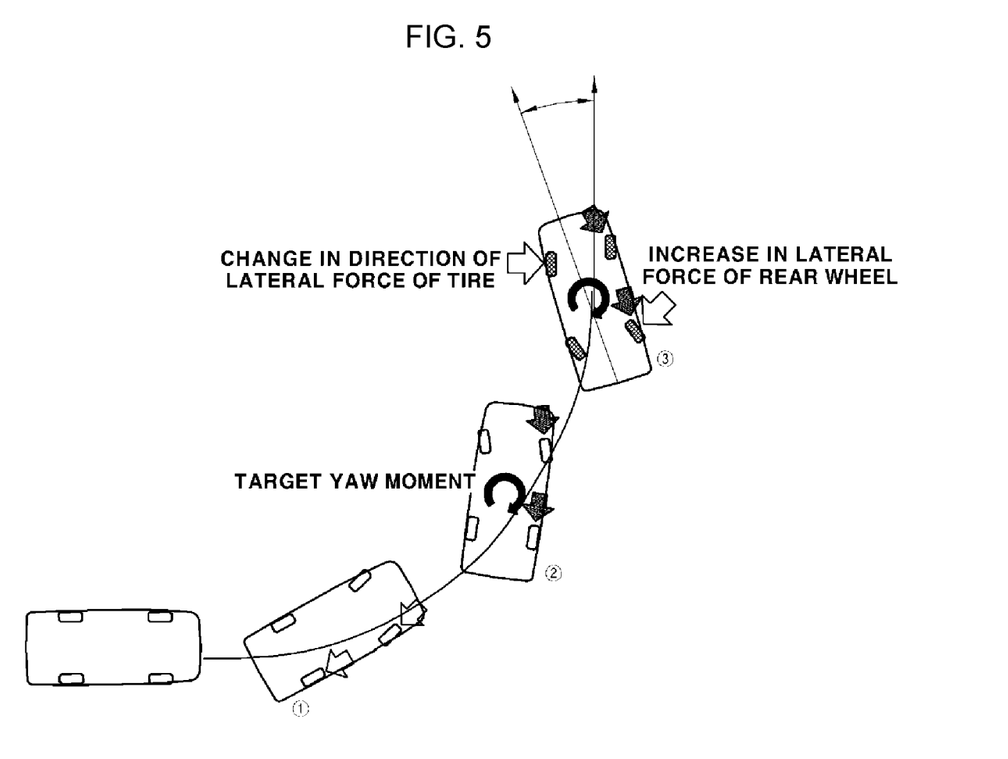
FIG. 5 illustrates a process in which a behavior of a vehicle is stabilized when the vehicle is turning while excessive oversteering occurs.

Meanwhile, FIG. 5 illustrates in detail a process in which a behavior of a vehicle is stabilized when the vehicle is turning while excessive oversteering occurs.

As shown in FIG. 5, when oversteering occurs, initial ESC braking control is performed on the basis of a yaw rate (State ① of FIG. 5), and braking control is further performed in consideration of a lateral slip angle β to converge on a yaw moment (State ② of FIG. 5).

When excessive oversteering is determined as occurring on the basis of the lateral slip angle β and the like, the vehicle is to be in a counter-steer state by applying a steering assist torque, and the RWS device 600 performs rear wheel reverse phase control to rapidly stabilize a behavior of the vehicle (State ③ of FIG. 5).

In the instant case, in comparison with a case of preventing oversteering with only ESC braking control, an amount of braking control is more reduced such that a sense of difference felt by the driver is diminished and a reduction in vehicle speed is also decreased. Furthermore, the amount of counter-steering that the driver may secure through an actual steering is reduced, the lateral slip angle β does not diverge, and the vehicle may be rapidly stabilized.

Thus, in accordance with a vehicle control system and a method for the same of the present invention, intervention of ESC control may be minimized to a level for preventing an extreme hazard situation when vehicle is turning, such that there is an effect which is configured for satisfying preference of a driver demanding dynamic driving performance.

Furthermore, in accordance with various aspects of the present invention, a steering assist torque is applied to prevent a lateral slip angle from becoming excessively large in an excessive oversteer situation, such that there is an effect which is configured for inducing vehicle control to be performed similar to a behavior of a skilled driver.

Furthermore, in accordance with various aspects of the present invention, the controller may be configured to determine whether a current state is a counter-steer state in an excessive oversteer situation, and rear wheel reverse phase control is performed when counter-steering occurs, such that there is an effect in that a behavior of the vehicle may be rapidly stabilized while a vehicle speed is reduced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle control method comprising:
   determining, by a controller, whether oversteering occurs;
   determining, by the controller, an amount of braking control and performing, by a braking device, the braking control;
   determining, by the controller, a steering assist torque in a direction opposite a turning direction of a vehicle and controlling a steering control device according to the determined steering assist torque; and
   determining, by the controller, an amount of rear wheel steering control and performing reverse phase control on a rear wheel steering device according to the determined amount of the rear wheel steering control.

2. The method of claim 1, wherein the performing of the braking control by the braking device includes determining the amount of braking control by adding up a first amount of braking control determined on a basis of a yaw rate and a second amount of braking control determined on a basis of a lateral slip angle β.

3. The method of claim 1, further including, before the performing of the reverse phase control on the rear wheel steering device, determining whether counter-steering occurs.

4. The method of claim 3, wherein the determining of whether the counter-steering occurs includes determining a turning direction of the vehicle according to the lateral slip angle β and determining as the counter-steering occurring, when a steering direction is different from the determined turning direction.

5. The method of claim 3, wherein the performing of the reverse phase control on the rear wheel steering device is performed when the counter-steering is determined as occurring.

6. The method of claim 2, wherein the determining of whether the oversteering occurs includes determining as the oversteering occurring when the lateral slip angle β is equal to or greater than a reference value.

7. The method of claim 2, wherein the determining of whether the oversteering occurs includes determining as the oversteering occurring when the yaw rate is larger than a target yaw rate.

8. The method of claim 1, further including, before the controlling of the steering control device, detecting a lateral slip angle β, determining whether a magnitude of the detected lateral slip angle β continuously increases, and controlling the steering control device when the magnitude of the detected lateral slip angle β continuously increases.

9. The method of claim 1, wherein the amount of the rear wheel steering control is determined by the following equation:

the amount of the rear wheel steering control=(lateral slip angle β−reference value of lateral slip angle β)×variation of lateral slip angle β×gain.

10. The method of claim 9, wherein the reference value of the lateral slip angle β is preset according to a vehicle speed or a friction coefficient of a road.

11. A vehicle control system comprising:
a detector configured to detect vehicle information including a yaw rate of a vehicle, a steering angle of the vehicle, and a lateral slip angle β of the vehicle;
a controller configured to determine a target yaw moment by receiving the vehicle information detected by the detector and determine an amount of braking control according to the target yaw moment;
a steering control device configured to generate a steering assist torque;
a rear wheel steering device configured to perform rear wheel steering control; and
a braking device configured to brake each of wheels according to the amount of braking control determined by the controller,
wherein the controller is configured to determine whether oversteering occurs, and when the oversteering is determined as occurring, the controller is configured to determine a steering assist torque in a direction opposite a turning direction of the vehicle, is configured to transmit the determined steering assist torque to the steering control device, is configured to determine an amount of rear wheel reverse phase steering control, and is configured to transmit the determined amount of the rear wheel reverse phase steering control to the rear wheel steering device.

12. The system of claim 11, wherein the controller is configured to determine the amount of the braking control by adding up a first amount of braking control determined on a basis of the yaw rate detected by the detector and a second amount of braking control determined on a basis of the lateral slip angle β.

13. The system of claim 11, wherein, when determining the amount of the rear wheel reverse phase steering control, the controller is configured to determine whether counter-steering occurs and is configured to determine the amount of rear wheel reverse phase steering control when the counter-steering is determined as occurring.

14. The system of claim 11, wherein the controller is configured to determine the turning direction of the vehicle according to the lateral slip angle β and when a steering direction is different from the determined turning direction, the controller is configured to determine the counter-steering as occurring.

15. The system of claim 11, wherein the controller is configured to determine the oversteering as occurring when the lateral slip angle β is equal to or greater than a reference value.

16. The system of claim 11, wherein the controller is configured to determine the oversteering as occurring when the yaw rate is larger than a target yaw rate.

17. The system of claim 11, wherein the controller is configured to determine whether a magnitude of the lateral slip angle β detected by the detector continuously increases, and when the magnitude of the lateral slip angle β continuously increases, the controller is configured to determine the steering assist torque.

18. The system of claim 11, wherein the amount of the rear wheel reverse phase steering control is determined by the following equation:

the amount of the rear wheel reverse phase steering control=(lateral slip angle β−reference value of lateral slip angle β)×variation of lateral slip angle β×gain.

19. The method of claim 18, wherein the reference value of the lateral slip angle β is preset according to a vehicle speed or a friction coefficient of a road.

* * * * *